Dec. 30, 1969    R. A. LANGLEY    3,487,207
INSTRUMENT FOR VARYING THE ANGLE OF INCIDENCE BETWEEN
ION BEAMS AND A SPECTROMETER
Filed April 13, 1967    4 Sheets-Sheet 2

INVENTOR.
ROBERT A. LANGLEY
BY Harry A. Herbert Jr
Attorney
Henry S. Miller Jr.
Agent

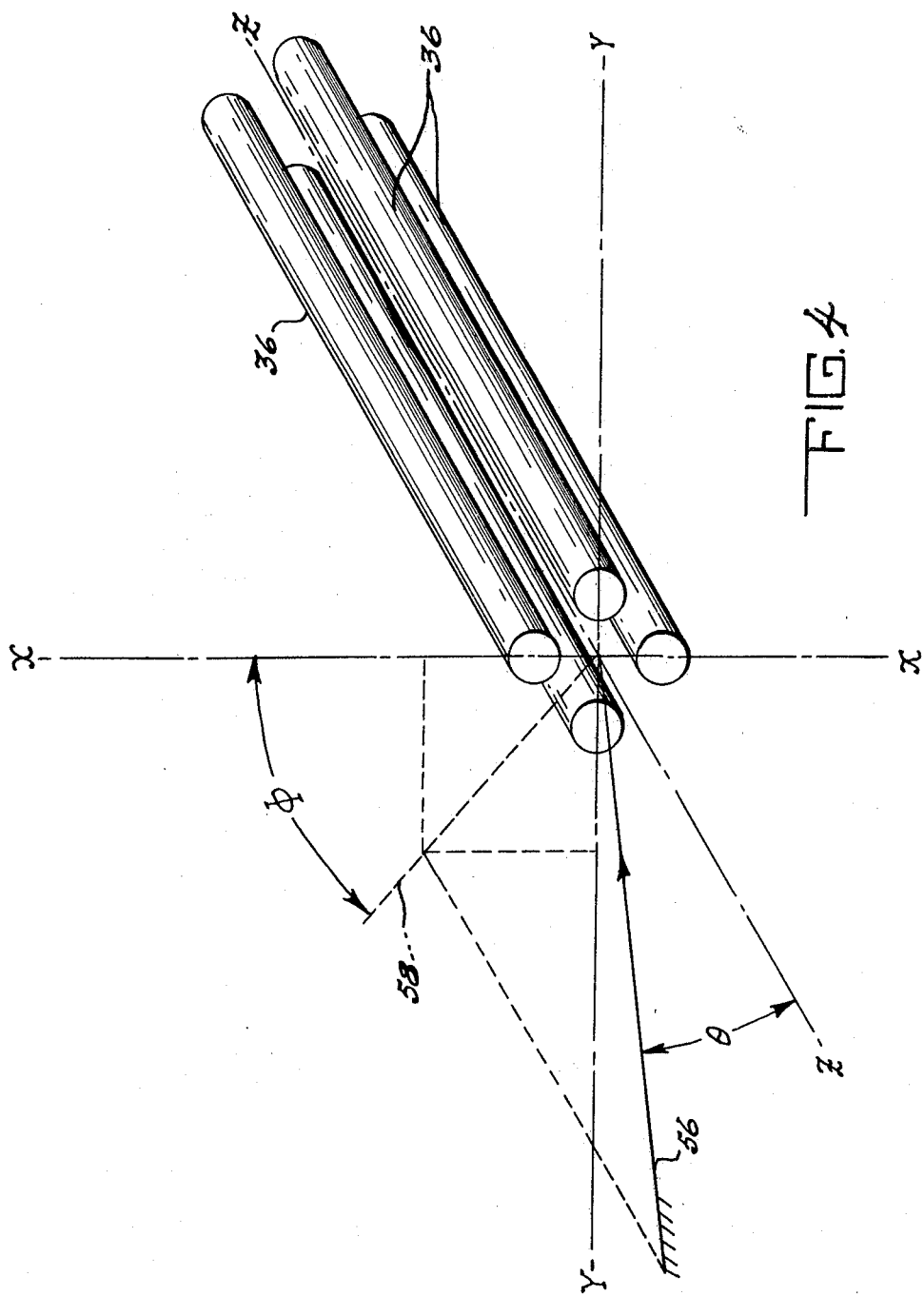

United States Patent Office 3,487,207
Patented Dec. 30, 1969

3,487,207
INSTRUMENT FOR VARYING THE ANGLE OF INCIDENCE BETWEEN ION BEAMS AND A SPECTROMETER

Robert A. Langley, Oak Ridge, Tenn., assignor to the United States of America as represented by the Secretary of the Air Force
Filed Apr. 13, 1967, Ser. No. 630,776
Int. Cl. H01j 39/34; B01d 59/44
U.S. Cl. 250—41.9                       4 Claims

ABSTRACT OF THE DISCLOSURE

An instrument for varying continuously the angle of incidence between a mass spectrometer and a plasma-generated ion beam. An outside collet is fixed while an inside collet is free to rotate about an axis inclined at 45° to the axis of the outside. The inside collet has a mass spectrometer mounted thereon which rotates with the collet about the inclined axis.

---

This invention relates generally to an instrument for calibrating mass spectrometers, and more specifically to a device for varying the angle of incidence between a beam of ions and a mass spectrometer, while the entrance port of the spectrometer remains fixed in space.

Earth satellites and high altitude rockets measuring bands of ions surrounding the earth pass in and out of these bands and continuously change orientation to the bands. If a spectrometer located in the satellite or rocket is properly calibrated, it is possible to calculate the number of ions in the band regardless of the instruments orientation to the band.

Ions enter the spectrometer through a small aperture in the satellite. Only the ions which enter this opening along the longitudinal axis of the spectrometer will reach the collector, although some ions entering at small angles will also reach the collector. Unless each spectrometer is properly calibrated, it is impossible to calculate the total number of ions, since each mass spectrometer has its own individual characteristics which may become significant in areas of low ion density.

The instrument of this invention makes it possible for the first time to calibrate the mass spectrometer on the ground before flight. This invention is capable of accurately moving the spectrometer through an angle of 90° simulating the various angles of attack of the satellite or rocket, while the entrance aperture remains fixed. During the calibration a source of ions is supplied by a plasma genertaor to simulate the ions in space.

It is therefore an object of this invention to provide a new and improved means for calibrating mass spectrometers.

It is a further object of this invention to provide a new and improved means for calibrating flyable mass spectrometers.

It is another object of this invention to provide a calibrating means for mass spectrometers which varies the angle of incidence of incoming particles while the entrance port remains fixed in space.

It is a further object of this invention to provide a new and improved means for continuously varying the angle of incidence between a mass spectrometer and an ion beam.

It is still another object of this invention to provide a calibration means which is economical to produce and utilizes conventional, currently available components that lend themselves to standard mass production manufacturing techniques.

These and other advantages, features, and objects of the invention will become more apparent from the following description taken in connection with the illustrative embodiment in the accompanying drawings wherein:

FIGURE 4 is a diagrammatic representation of this invention showing the entrance geometry and a quadrupole spectrometer.

Figure 1:
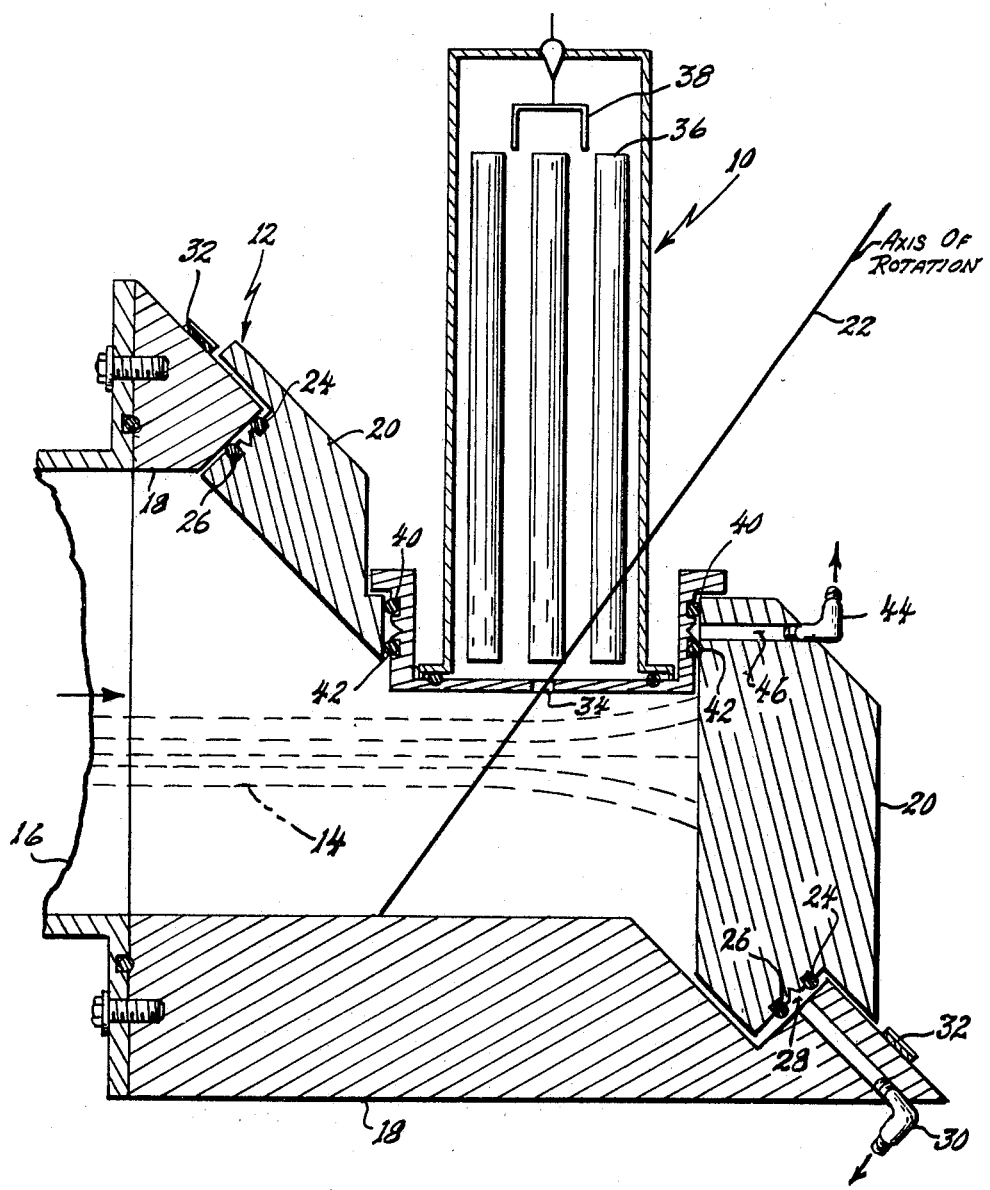
FIGURE 1 is a sectional view showing the arrangement of parts in the invention with the angle of incidence set at 90°.

Referring now to FIGURE 1, a quadrupole mass spectrometer is shown generally at 10, while the calibrating instrument is shown generally at 12. Ions 14 from a plasma generator (not shown) enter the instrument at 16. An outside collet 18, which is fixed and may be machined from aluminum, supports an inside collet 20. The inside collet is free to rotate about the axis of rotation 22. Looking down on the instrument along the axis of rotation, both the inner and outer collets appear circular. The axis of rotation is inclined at an angle of 45° to the incoming beam of ions.

The vacuum seal between the collets comprises a pair of O-rings, 24 and 26, mounted in parallel grooves. The volume 28 between the O-rings is evacuated through the means 30 which connects to a vacuum pump. The seal, as shown, permits relative rotational motion between the collets while maintaining an ultimate vacuum of less than $10^{-7}$ torr. Without this means for sealing there is a possibility of an undesirable pressure bursts occurring as the inside collet is rotated.

The R-F quadrupole mass spectrometer shown in this disclosure, but not limiting the invention thereto, is not necessarily isotropic about its longitudinal axis. It is desrable, therefore, that the instrument, in addition, rotate about this axis to provide information concerning all entrance configurations including any particular optimum configuration.

A means for determining the angle of incidence between the beam of incoming ions and the entrance to the mass spectrometer is provided by the scale 32 mounted on the outside collet. The scale is marked in degrees, with an index located on the inner collet.

The ions enter the mass spectrometer through the entrance port 34 and are separated as they pass through the rods 36 so that only ions of the correct charge to mass ratio reach the Faraday collector 38 where they are detected.

The measuring instrument is rotatably mounted on the inside collet in the same manner that the inside collet is mounted on outside collet. A pair of O-rings 40 and 42 are located in parallel grooves on the instrument and the space between them is evacuated. The pipe fitting 44 is fixed in port 46 which is open to the volume between the O-rings. In operation the fitting is connected to vacuum pump.

Figure 2:
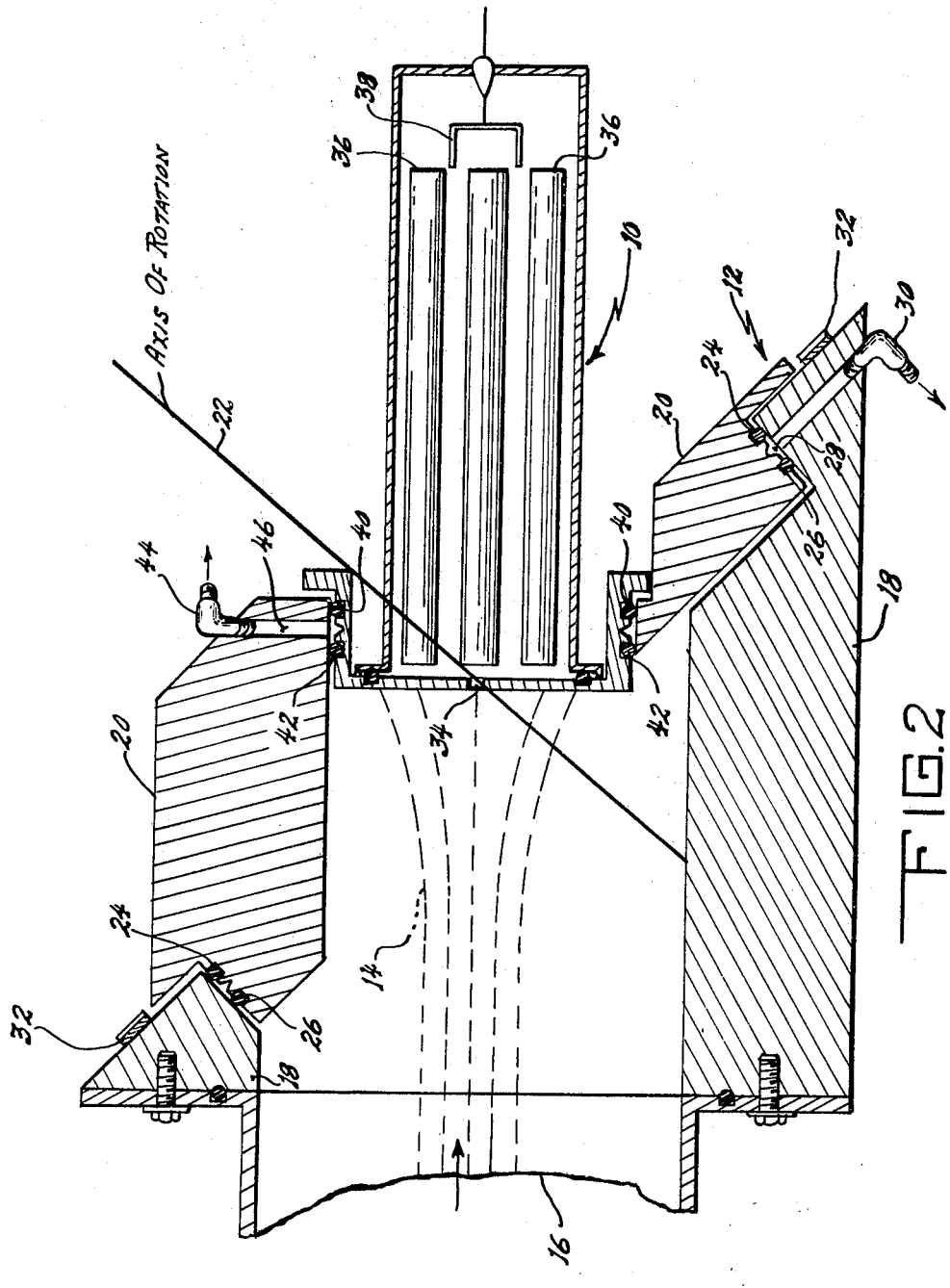
FIGURE 2 is a sectional view of the invention with the angle of incidence set at 0°.

FIGURE 2 shows the mass spectrometer with the angle of incidence 0° to the ion beam. This is the angle at which the greatest number of ions enter the instrument and is the most desirable angle of attack for the instrument when used in a rocket probe or satellite.

Figure 3:
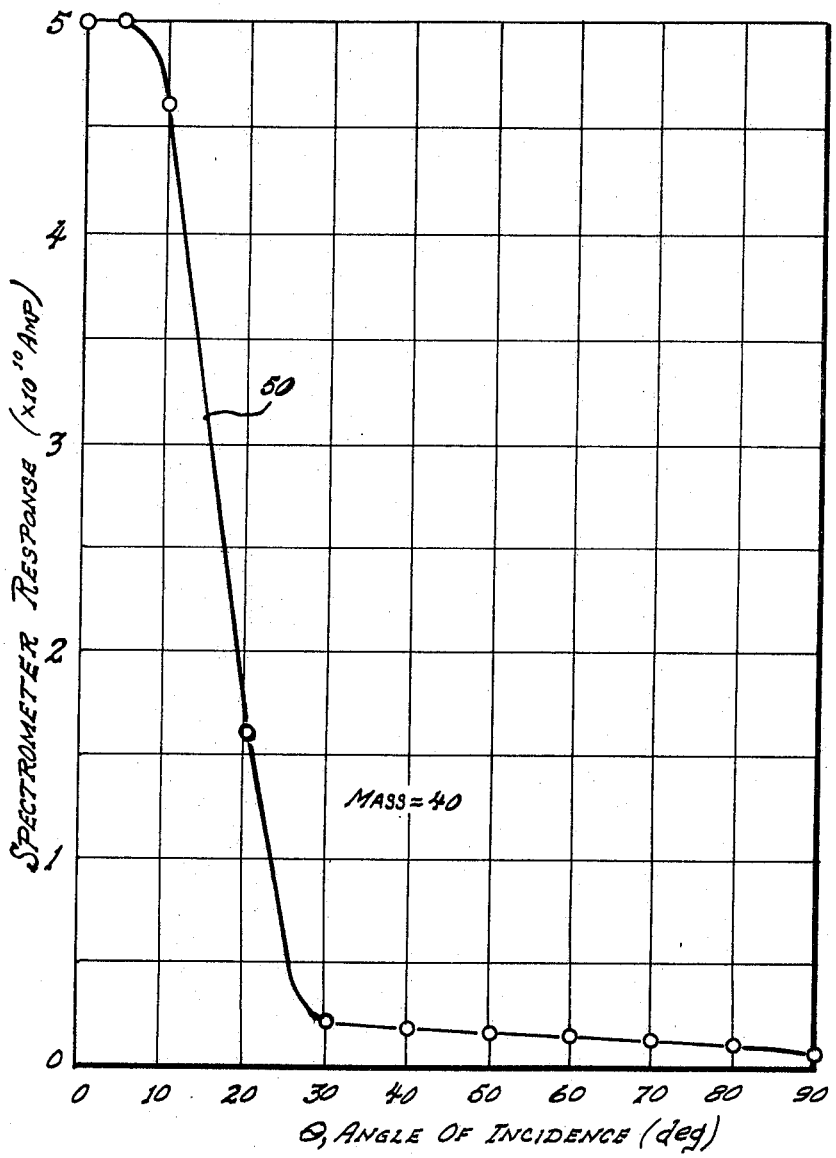
FIGURE 3 is a mass spectrometer calibration graph showing spectrometer response versus angle of incidence.

A representative curve of spectrometer response for mass 40 versus angle of incidence is shown in FIGURE 3 for an argon plasma. The spectrometer response 50 decreases only slightly in going from 0 to 10 degrees. As the angle of incidence varies from 10 to 30 degrees, the response decreases by a factor of 25 and as the angle increases from 30 to 90 degrees, the response is constant as almost no ions will enter the spectrometer.

In FIGURE 4, there is shown the geometric relationship of the mass spectrometer to the beam of ions.

The orthogonal coordinate system is defined by three axes, X, Y and Z. The longitudinal axis of the mass spectrometer Z is inclined at an angle of 45 degrees to the axis of the ion beam 56 which it intersects creating an angle of incidence $\theta$. The angle between the axis of the spectrometer Z and the axis of rotation 58 ($\Phi$) remains a constant 45 degrees. The axis of the mass spectrometer could thus be rotated about the axis of rotation to generate a cone of half-angle 45 degrees by rotating the inside collet 20 about the axis of rotation which further changes the angle of incidence $\theta$. The relationship between the angle of rotation and the angle of incidence can be expressed:

$$\cos \theta = \tfrac{1}{2} + \tfrac{1}{2} \text{ of } X$$

where X is the angle through which collet 20, and hence the mass spectrometer, is rotated about the axis of rotation, and $\theta$ is the angle of incidence, with reference points chosen so that $\theta=0$ when $X=0$. As the angle of incidence was varied the center of the entrance port of the mass spectrometer remained fixed in space.

Although the invention has been described with reference to a particular embodiment, it will be understood to those skilled in the art that the invention is capable of a variety of alternative embodiments within the spirit and scope of the appended claims.

I claim:

1. An apparatus for continuously varying the angle of incidence between a mass spectrometer and an ion beam comprising: a first fixed collet means; a second collet means rotatably mounted in said first collet means; a mass spectrometer rotatably mounted in said second collet means and having an entrance aperture; and said second collet mounted in a manner that its axis of rotation is inclined at an angle of 45 degrees to the longitudinal axis of the first collet, whereby the said aperture remains fixed in space as said second collet turns.

2. An apparatus for continuously varying the angle of incidence between a mass spectrometer and an ion beam, according to claim 1, including: an evacuated seal between the first and second collet to permit rotation at a high vacuum.

3. An apparatus for continuously varying the angle of incidence between a mass spectrometer and an ion beam, according to claim 2, including: an evacuated seal between the second collet and mass spectrometer to permit relative rotation at a high vacuum.

4. An apparatus for continuously varying the angle of incidence between a mass spectrometer and an ion beam, according to claim 3, including: a means mounted on the first collet to indicate the degrees of rotation of the second collet.

References Cited

UNITED STATES PATENTS 3,299,266  1/1967  Johnson _____ 250—41.9

RALPH G. NILSON, Primary Examiner

S. C. SHEAR, Assistant Examiner